2,786,760
METHOD OF FORMING EDIBLE DUST-FREE PARTICLES

Paul Bonnafoux, Lancaster, Calif.

No Drawing. Application September 2, 1954,
Serial No. 453,951

4 Claims. (Cl. 99—2)

This invention relates to a method of forming dust-free particles of edible material, said particles being generally known to the trade as "crumbles."

One of the major problems encountered in the manufacture of various types of poultry and animal feeds is the problem of edible dusts formed during the processing of said feeds. For instance, a common form of poultry or small mammal feed is that sold in "crumble" form wherein particles of the feed varying in size from about $1/16$ to $3/16$ of an inch are provided. When these particles are fabricated by customary procedures, large quantities of dust are formed which are separated from the "crumbles" by screening. Since the dust frequently constitutes as high as fifteen percent of the total output, it must be rerun through the process which lowers the food value of the edible material and also reduces the output of "crumbles."

"Crumbles" or particles of feed are usually formed by grinding the feed after it has been pelletized subsequently to the cooling of the pellets. As a matter of fact, most grinding of the pellets takes place a relatively long time after the formation and cooling of the pellets. When the hardened pellets are ground, edible dusts inevitable form since, during the grinding process, pulverization of certain parts of the pellets, due to attrition, necessarily takes place.

It is, therefore, an object of my invention to provide a method of forming dust-free particles of edible material known to the art as "crumbles," thus eliminating the annoyance and loss occasioned by large quantities of edible dust resulting from the formation of "crumbles" by conventional methods.

In describing the steps of my method, I will illustrate said steps by the application of the method to the formation of "crumbles" of alfalfa but it is, of course, not intended that the method of the invention be limited to this specific application since poultry and other feeds manufactured from various mixtures of cereals or other ingredients can be readily formed into dust-free particles by the application of the teachings of my invention.

Another of the disadvantages of the conventional methods utilized in forming "crumbles" for feed purposes is the fact that, when the pellets of feed are formed by extrusion under the tremendous pressures necessary, the heat generated in the process results in elevated temperatures in the pellets and the pellets must necessarily be cooled to reduce said temperatures and the oxidation of the edible elements included in the pellets so that the vitamin content and color of the pellets will not be adversely affected. Because of the exceedingly compact nature of the pellets, the cooling process frequently takes as long as twenty minutes and during this process the oxidation of the edible components of the pellets takes place, reducing the vitamin content and altering the natural color thereof. Therefore, when "crumbles" are formed from the pellets by grinding the same after they have cooled and hardened, the resulting particles are not only accompanied by a substantial amount of edible dust, but the vitamin content thereof has been lowered and the natural color of the ingredients substantially darkened by the oxidation resulting from the prolonged heating period.

An additional object of my invention is the provision of a method of forming dust-free particles of edible material which includes the steps of forming the edible material into homogeneous, solid bodies which momentarily retain their semi-plastic nature after their formation and, immediately thereafter, grinding the semi-plastic bodies into particles which are characterized by the substantially complete absence of edible dust.

A further object of my invention is the provision of a method of the aforementioned character wherein the edible material is ground and moistened prior to the formation of the aforesaid bodies and wherein the aforesaid bodies are formed by the extrusion process, the high pressures occasioned by said extrusion process resulting in the elevation of the temperature of the ground edible material to temperatures in the range of 125–210° F. Of course, the elevated temperatures reached during the extrusion of the bodies materially increases the plasticity of the edible material and results in a homogeneous, extremely compact pellet which is discharged from the extruding device in semi-plastic, heated condition. While the pellet still remains in the semi-plastic, heated condition, it is subjected to a grinding process which results in dust-free particles of edible material or "crumbles."

In the formation of alfalfa "crumbles," the basic raw material consists of alfalfa hay and this hay must be moistened subsequently to the grinding thereof prior to the formation of semi-plastic bodies from the ground hay. In order to assist in the agglomeration of the ground hay, it is moistened by steam which necessitates the provision of a boiler or other steam-generating apparatus in the plant where the "crumbles" are formed.

Another object of my invention is the provision of a method of forming alfalfa "crumbles" which includes the step of admixing with the alfalfa hay freshly mowed alfalfa bearing its full content of natural moisture. When the alfalfa hay and the freshly mowed alfalfa, in green form, are ground together, the natural moisture of the green alfalfa eliminates the necessity for moistening with the steam in the above described conventional manner and eliminates the necessity for the maintenance of a steam plant.

In addition, the natural green of the fresh alfalfa materially improves the color of the end product and, of course, increases the vitamin content of said end product.

As previously indicated, I will illustrate the method of my invention as applied to the formation of alfalfa "crumbles," but it is, of course, not intended to limit the application of the principles of my invention to the specific product since it is obvious that various types of animal and other feeds may be formed into dust-free "crumbles" by the utilization of the teachings of my invention.

As the first step of the process, the dry alfalfa hay is ground in a hammer mill, or similar device, to reduce it to relatively small fragments. Subsequently to the grinding of the hay, it is moistened, as by means of steam, to facilitate the agglomeration of the ground hay during the formation of individual bodies, or pellets, therefrom.

After the moistening of the ground hay has taken place, the ground hay is subjected to a forming process wherein it may be formed either into individual compacted pellets, or into continuous extruded lengths of edible material which are equivalent in density and plasticity to the density and plasticity of the aforementioned pellets.

For instance, one conventional method utilized in forming the extruded lengths of edible material is to feed the moistened, ground hay between two rolls which are provided with a plurality of radial openings through which the ground and moistened hay is forced. Since pressures as high as 10,000 p. s. i. are exerted upon the ground hay during the extrusion process, relatively high temperatures are engendered in the hay which are conducive to greater plasticity in the ground hay and materially facilitate the formation of the ground hay into compact bodies or pellets.

I have attempted to ascertain the temperatures at which the ground hay is extruded from the extrusion machine and have found them to range between 125° F. and 210° F., the range in temperature being attributable to the density of the hay mix, the extent to which the hay has been moistened, and the speed at which the forming dies are rotated, together with the pressure exerted upon the ground hay by said forming dies.

The ground hay is formed into compact, solid, elongated bodies which, because of the intense heat and pressures to which they have been subjected, are semi-plastic in nature and at temperatures ranging between 125° F. and 210° F. when they issue from the extruding machine. In customary practice, the elongated bodies are cut into pellets and are subsequently cooled by being passed through a blast of cooling air which results in the reduction of the temperature of the pellets to the ambient temperature in approximately twenty minutes. However, during this cooling period a large percentage of the nutritional factors and particularly vitamin A is lost. In conventional practice, after the pellets have been cooled, they are then ground and formed into particles ranging in size from $\frac{1}{16}$ to $\frac{3}{16}$ of an inch, with rare exceptions, to provide the ground feed known to the art as "crumbles."

During the conventional process, a large amount of edible dust, approximately fifteen percent, is formed and since the "crumbles" are screened, this edible dust is rejected and must be reprocessed through the forming dies of the extruding machine. Naturally, such reprocessing entails a considerable loss in handling and machine time and, furthermore, reduces the nutritional content of the reprocessed edible material because of the fact that it is twice or three times subjected to intense pressures and heat.

In the process of my invention, when the elongated extruded bodies issue from the extruding device, they are immediately, while in semi-plastic and heated condition, passed to grinders which break the elongated bodies into particles. Because of the semi-plastic nature of the bodies and the tendency of the constituent edible material thereof to remain in agglomerated form, there is a complete absence of the edible dust encountered when the "crumbles" are formed by conventional processes. Furthermore, since the bodies are immediately reduced to particle size, the cooling of the particles is expedited with the result that the food values of the "crumbles" are preserved since there is not encountered the long cooling period necessary when the material is retained in pellet form as is the case in conventional practice. Thus, with the process of my invention there is no necessity for reprocessing a relatively large amount of edible dust and the nutritional values of the edible material being processed are retained at a high level because of the fact that the immediate reduction of the bodies of material to "crumbles" causes and permits the quicker cooling thereof.

After the elongated bodies have been formed into "crumbles" they are passed through a cooling blast of air to accelerate the cooling process. Subsequently, they are screened to remove any excessively large particles from the mass and the relatively few excessively large particles encountered in conventional practice are reground.

As previously indicated, it is necessary to moisten the dried ground material with steam or other moisture in order to permit and facilitate the agglomeration of the edible material. Moistening the edible material by the use of steam necessitates maintenance of a steam generating plant and I have discovered that particularly in the processing of edible materials in the dry state, which are normally found in the green or fresh state loaded with a large moisture content, it is desirable to eliminate the moistening step by incorporating in the original mass of edible material to be ground a percentage of green, fresh, moist material of approximately ten to twenty-five percent.

For instance, prior to the grinding of the aforementioned alfalfa hay, it is dumped on a conveyor line and green, fresh alfalfa is dumped on top of the hay in a percentage ranging from ten to twenty-five percent. The mass of green alfalfa and alfalfa hay is then fed to the hammer mill or other grinding machine and the entire mass is thoroughly ground and mixed to disperse the fresh, moist, green alfalfa among the alfalfa hay.

Thus, the moisture content of the mix is automatically increased without the necessity for the use of additional moistening means such as steam, previously mentioned as being customarily used. Furthermore, since the fresh, green color of the alfalfa is imparted to the hay, the color of the end product is materially improved. In addition, the vitamin content and particularly the vitamin A content of the end product is raised to a substantial extent.

I, therefore, provide a method for forming "crumbles" of edible material which results in a product characterized by the absence of the large quantities of dust resulting from conventional processes and which also results in a superior, better color, more nutritious product.

I claim as my invention:

1. In a method of forming dust-free particles of poultry and animal edible feed material, the steps of: simultaneously subjecting said edible material to heat and pressure; extruding said edible material into elongated bodies in a semi-plastic, heated state; and grinding said elongated bodies while still in said semi-plastic, heated state to form dust-free particles of said edible material.

2. In a method of forming dust-free particles of poultry and animal edible feed material, the steps of: subjecting said edible material simultaneously to heat and pressure; extruding said edible material in the form of semi-plastic, pellets; grinding said pellets while still hot and in said semi-plastic condition to form dust-free particles of said edible material; and cooling said dust-free particles to prevent oxidation of said edible material.

3. In a method of forming dust-free particles from ground poultry and animal edible feed material, the steps of: moistening said ground edible material to facilitate the agglomeration of the same; subjecting said moistened edible material to pressure, said pressure causing the heating of said moistened ground material; extruding said edible material into hot, semi-plastic pellets; and grinding said pellets while still in said heated, semi-plastic state to form said dust-free particles.

4. In a method of forming dust-free particles from ground poultry and animal edible feed material, the steps of: simultaneously subjecting said ground material to heat within a range of 125° F. to 210° F. and pressure to extrude homogeneous, solid pellets therefrom which are momentarily in a semi-plastic and heated state; and grinding said solid pellets while still in said semi-plastic and heated state to form said dust-free particles.

References Cited in the file of this patent

UNITED STATES PATENTS

| | | |
|---|---|---|
| 254,327 | Jaeger | Feb. 28, 1882 |
| 2,168,532 | McMath et al. | Aug. 8, 1939 |
| 2,624,514 | Wilhousky | Jan. 6, 1953 |
| 2,739,895 | Varney et al. | Mar. 27, 1956 |